US006235832B1

(12) United States Patent
Deng et al.

(10) Patent No.: US 6,235,832 B1
(45) Date of Patent: May 22, 2001

(54) RTV SILICONE COMPOSITIONS WITH RAPID DEVELOPMENT OF GREEN STRENGTH

(75) Inventors: Qin Deng; Robert Harold Krahnke; Loren Dale Lower, all of Midland; Timothy B. Lueder, Mt. Pleasant; Richard Alan Palmer; Nick Evan Shephard, both of Midland, all of MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/456,423

(22) Filed: Dec. 8, 1999

Related U.S. Application Data

(63) Continuation-in-part of application No. 09/217,421, filed on Dec. 21, 1998, now abandoned.

(51) Int. Cl.⁷ .............................. C08G 77/18; C08K 3/36; C08K 3/26

(52) U.S. Cl. .......................... 524/525; 524/492; 528/12; 528/37; 528/17; 528/18; 528/39; 556/458; 556/464

(58) Field of Search .......................... 528/12, 37, 17, 528/39, 18; 556/458, 464; 524/525; 525/474, 477

(56) References Cited

U.S. PATENT DOCUMENTS

| | | | |
|---|---|---|---|
| 3,109,013 | 10/1963 | Haluska | 260/448.2 |
| 3,122,522 | 2/1964 | Brown et al. | 260/46.5 |
| 3,151,099 | 9/1964 | Frederic et al. | 260/46.5 |
| 3,161,614 | 12/1964 | Brown et al. | 260/46.5 |
| 3,175,993 | 3/1965 | Weyenberg | 260/46.5 |
| 3,294,739 | 12/1966 | Weyenberg | 260/46.5 |
| 3,334,067 | 8/1967 | Weyenberg | 260/46.5 |
| 3,631,193 | 12/1971 | Young | 260/448.2 |
| 3,671,483 | 6/1972 | Young | 260/32.8 |
| 3,714,109 | 1/1973 | Matherly | 260/32.8 |
| 3,794,556 | 2/1974 | Young | 161/206 |
| 3,819,674 | 6/1974 | Rudolph et al. | 260/448.2 |
| 3,836,503 | 9/1974 | Schulz | 260/37 |
| 4,283,519 | 8/1981 | Pines et al. | 528/26 |
| 4,395,526 | 7/1983 | White et al. | 528/18 |
| 4,417,042 | 11/1983 | Dziark | 528/18 |
| 4,460,761 | 7/1984 | Schiller et al. | 528/18 |
| 4,461,867 | 7/1984 | Surprenant | 524/788 |
| 4,467,063 | 8/1984 | Lockhart | 524/106 |
| 4,472,551 | 9/1984 | White et al. | 524/728 |
| 4,472,564 | 9/1984 | Lockhart | 528/18 |
| 4,477,625 | 10/1984 | Lockhart | 524/789 |
| 4,483,972 | 11/1984 | Mitchell | 528/18 |
| 4,483,973 | 11/1984 | Lucas et al. | 528/21 |
| 4,489,191 | 12/1984 | Chung | 524/779 |
| 4,489,200 | 12/1984 | Dziark | 528/18 |
| 4,495,330 | 1/1985 | Chung | 524/783 |
| 4,499,229 | 2/1985 | Lockhart | 524/450 |
| 4,499,230 | 2/1985 | Lockhart | 524/450 |
| 4,499,234 | 2/1985 | Pratt et al. | 524/783 |
| 4,503,209 | 3/1985 | Lucas | 528/18 |
| 4,513,115 | 4/1985 | Beers | 524/731 |
| 4,517,337 | 5/1985 | Lockhart et al. | 524/859 |
| 4,523,001 | 6/1985 | Swiger et al. | 528/18 |
| 4,525,400 | 6/1985 | Surprenant | 428/54 |
| 4,525,566 | 6/1985 | Homan et al. | 528/17 |
| 4,528,352 | 7/1985 | Chung | 528/18 |
| 4,528,353 | 7/1985 | Lucas et al. | 528/21 |
| 4,536,540 | 8/1985 | Dziark | 524/701 |
| 4,539,367 | 9/1985 | Beers | 524/731 |
| 4,554,338 | 11/1985 | Wengrovias | 528/18 |
| 4,555,420 | 11/1985 | Lucas | 427/387 |
| 4,563,498 | 1/1986 | Lucas | 524/788 |
| 4,578,492 | 3/1986 | Pratt et al. | 556/407 |
| 4,579,964 | 4/1986 | Totten et al. | 556/434 |
| 4,593,085 | 6/1986 | Lucas | 528/18 |
| 4,599,394 | 7/1986 | Lucas | 528/15 |
| 4,616,076 | 10/1986 | Ona et al. | 528/15 |
| 4,652,624 | 3/1987 | Allen et al. | 528/17 |
| 4,667,007 | 5/1987 | Wengrovias et al. | 528/18 |
| 4,670,532 | 6/1987 | Lucas | 528/18 |
| 4,680,364 | 7/1987 | Lucas | 528/15 |
| 4,720,531 | 1/1988 | Chung | 528/18 |
| 4,731,411 | 3/1988 | Lucas | 524/860 |
| 4,743,474 | 5/1988 | Homan | 427/387 |
| 4,755,578 | 7/1988 | Lucas | 528/17 |
| 4,772,675 | 9/1988 | Klosowski et al. | 528/15 |
| 4,839,453 | 6/1989 | Chung | 528/18 |

(List continued on next page.)

FOREIGN PATENT DOCUMENTS 0 803 541 A1  10/1997  (EP) .............................. C08L/83/04

OTHER PUBLICATIONS

Application No. 09/217,421, Attorney Docket No. DC4720, "RTV Silicone Compositions With Rapid Development of Green Strength," Filed Dec. 21, 1998.

Primary Examiner—Robert Dawson
Assistant Examiner—Kuo-Liang Peng
(74) Attorney, Agent, or Firm—Patricia M. Scaduto

(57) ABSTRACT

A room temperature vulcanizing (RTV) silicone composition curable in the presence of moisture with rapid development of green strength. The RTV silicone composition comprises (A) 0 to about 85 weight percent polydiorganosiloxanes comprising on average at least 1.2 chain terminations per molecule selected from the group consisting of hydroxysilyl groups and alkoxysilyl groups; (B) about 10 to 95 weight percent polydiorganosiloxanes comprising on average at least 1.2 chain terminations per molecule selected from the group consisting of hydroxysilyl groups, alkoxysilyl groups, and multi-alkoxysilyl groups, provided that at least one chain termination per molecule comprises a multi-alkoxysilyl group; (C) an effective amount of a condensation catalyst; (D) 0 to about 40 weight percent of an alkoxysilane; and (E) 0 to about 60 weight percent of a filler; provided that the sum of the weight percents of Components (A) and (B) comprises about 20 to 95 weight percent based on the total weight of the RTV silicone composition.

37 Claims, No Drawings

U.S. PATENT DOCUMENTS

| | | | |
|---|---|---|---|
| 4,849,491 | 7/1989 | Ogawa et al. | 528/15 |
| 4,871,827 | 10/1989 | Klosowski et al. | 528/17 |
| 4,873,305 | 10/1989 | Cavezzan et al. | 528/18 |
| 4,888,404 | 12/1989 | Klowowski et al. | 528/15 |
| 4,895,918 | 1/1990 | Lucas | 528/18 |
| 4,898,910 | 2/1990 | Kamis et al. | 524/860 |
| 4,929,702 | 5/1990 | Cavezzan et al. | 528/18 |
| 4,956,435 | 9/1990 | Chu et al. | 528/17 |
| 4,956,436 | 9/1990 | Letoffe et al. | 528/18 |
| 4,965,333 | 10/1990 | Inouye et al. | 528/33 |
| 4,968,824 | 11/1990 | Cavezzan et al. | 556/90 |
| 5,017,672 | 5/1991 | Krahnke et al. | 528/23 |
| 5,079,311 | 1/1992 | Colas | 525/478 |
| 5,091,484 | 2/1992 | Colas et al. | 525/477 |
| 5,097,054 | 3/1992 | Yamamoto et al. | 556/451 |
| 5,118,724 | 6/1992 | Frances et al. | 522/99 |
| 5,175,328 | 12/1992 | Okawa et al. | 556/451 |
| 5,194,649 | 3/1993 | Okawa | 556/451 |
| 5,232,982 | 8/1993 | Lucas | 524/731 |
| 5,244,938 | 9/1993 | Arai et al. | 523/206 |
| 5,272,243 | 12/1993 | Nakashima et al. | 528/31 |
| 5,286,766 | 2/1994 | Arai et al. | 523/213 |
| 5,359,109 | 10/1994 | Ritscher et al. | 556/434 |
| 5,371,164 | 12/1994 | Kobayashi et al. | 528/18 |
| 5,378,790 | 1/1995 | Michalczyk et al. | 528/35 |
| 5,403,881 | 4/1995 | Okawa et al. | 524/261 |
| 5,416,230 | 5/1995 | Jung et al. | 556/451 |
| 5,420,196 | 5/1995 | Lucas | 524/730 |
| 5,442,083 | 8/1995 | Kobayashi | 556/434 |
| 5,446,185 | 8/1995 | Cobb et al. | 556/451 |
| 5,457,148 | 10/1995 | Lucas | 524/731 |
| 5,489,479 | 2/1996 | Lucas et al. | 428/412 |
| 5,519,104 | 5/1996 | Lucas | 528/18 |
| 5,548,051 | 8/1996 | Michalczyk et al. | 528/15 |
| 5,557,000 | 9/1996 | Minemura | 556/434 |
| 5,567,833 | 10/1996 | Iwahara et al. | 556/434 |
| 5,581,008 | 12/1996 | Kobayashi | 556/434 |
| 5,639,845 | 6/1997 | Inomata et al. | 528/15 |
| 5,670,686 | 9/1997 | Cobb et al. | 556/445 |
| 5,733,996 | 3/1998 | De Buyl et al. | 528/17 |
| 5,840,794 | 11/1998 | Palmer | 524/425 |
| 5,908,909 | 6/1999 | De Buyl et al. | 528/17 |
| 5,948,854 | 9/1999 | de Buyl et al. | 524/788 |
| 6,008,284 | 12/1999 | Nylund et al. | 524/425 |
| 6,013,753 | 1/2000 | Krahnke et al. | 528/32- |

RTV SILICONE COMPOSITIONS WITH RAPID DEVELOPMENT OF GREEN STRENGTH

This is a continuation-in-part of application Ser. No. 09/217,421 filed on Dec. 21, 1998 now abandoned.

FIELD OF THE INVENTION

A room temperature vulcanizing (RTV) silicone composition curable in the presence of moisture with rapid development of green strength. The RTV silicone composition comprises (A) 0 to about 85 weight percent polydiorganosiloxanes comprising on average at least 1.2 chain terminations per molecule selected from the group consisting of hydroxysilyl groups and alkoxysilyl groups; (B) about 10 to 95 weight percent polydiorganosiloxanes comprising on average at least 1.2 chain terminations per molecule selected from the group consisting of hydroxysilyl groups, alkoxysilyl groups, and multi-alkoxysilyl groups, provided that at least one chain termination per molecule comprises a multi-alkoxysilyl group; (C) an effective amount of a condensation catalyst; (D) 0 to about 40 weight percent of an alkoxysilane; and (E) 0 to about 60 weight percent of a filler; provided that the sum of the weight percents of Components (A) and (B) comprises about 20 to 95 weight percent based on the total weight of the RTV silicone composition.

BACKGROUND OF THE INVENTION

Polyorganosiloxane compositions which cure to elastomeric materials at room temperature are well known. Such compositions can be obtained by mixing polydiorganosiloxanes having reactive groups, such as silanol groups, with silane crosslinking agents, for example, alkoxysilanes, acetoxysilanes, oximosilanes, or aminosilanes, and catalysts as necessary. Compositions comprising these ingredients can then be cured by exposure to atmospheric moisture at room temperature.

Moisture curable compositions are well known for their use as sealants. Moisture curable compositions require a significant amount of time, commonly several days, in which to fully cure before reaching maximum strength. In certain applications which utilize sealant in assembly line applications, it is necessary to use a sealant which can rapidly develop green strength. Sealants which rapidly develop green strength have the advantage of allowing the sealant user to handle, package and ship the assembled construction after relatively shorter cure times without damage to the assembled construction, thus increasing production line speed and lowering product inventory. Green strength as defined herein means the strength of the sealant used in an assembled construction before the sealant has fully cured.

The present inventors have unexpectedly determined that RTV silicone compositions comprising about 10 to 95 weight percent based on the total weight of the RTV silicone composition of polydiorganosiloxanes comprising on average at least 1.2 chain terminations per molecule selected from the group consisting of hydroxysilyl groups, alkoxysilyl groups, and multi-alkoxysilyl groups, provided that at least one chain termination per molecule is a multi-alkoxysilyl group rapidly develop green strength upon exposure to moisture.

One objective of this invention is to prepare a RTV silicone composition curable in the presence of moisture with rapid development of green strength.

SUMMARY OF THE INVENTION

The present invention is a RTV silicone composition curable in the presence of moisture with rapid development of green strength. The RTV silicone composition comprises (A) 0 to about 85 weight percent polydiorganosiloxanes comprising on average at least 1.2 chain terminations per molecule selected from the group consisting of hydroxysilyl groups and alkoxysilyl groups; (B) about 10 to 95 weight percent polydiorganosiloxanes comprising on average at least 1.2 chain terminations per molecule selected from the group consisting of hydroxysilyl groups, alkoxysilyl groups, and multi-alkoxysilyl groups, provided that at least one chain termination per molecule comprises a multi-alkoxysilyl group; (C) an effective amount of a condensation catalyst; (D) 0 to about 40 weight percent of an alkoxysilane; and (E) 0 to about 60 weight percent of a filler; provided that the sum of the weight percents of Components (A) and (B) comprises about 20 to 95 weight percent based on the total weight of the RTV silicone composition.

DETAILED DESCRIPTION OF THE INVENTION

The present invention is a RTV silicone composition curable in the presence of moisture, comprising (A) 0 to about 85 weight percent polydiorganosiloxanes comprising on average at least 1.2 chain terminations per molecule selected from the group consisting of hydroxysilyl groups described by formula

and alkoxysilyl groups described by formula

where each $R^2$ is independently selected from the group consisting of a hydrogen atom and monovalent hydrocarbon radicals comprising 1 to about 18 carbon atoms, each $R^3$ is an independently selected alkyl radical comprising 1 to about 8 carbon atoms, each Z is independently selected from the group consisting of divalent hydrocarbon radicals comprising about 2 to 18 carbon atoms and a combination of divalent hydrocarbon radicals and siloxane segments described by formula

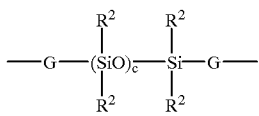

where $R^2$ is as defined above, each G is an independently selected divalent hydrocarbon radical comprising about 2 to 18 carbon atoms, and c is a whole number from 1 to about 6, x is 0 or 1, and y is 0 or 1;

(B) about 10 to 95 weight percent polydiorganosiloxanes comprising on average at least 1.2 chain terminations per molecule selected from the group consisting of hydroxysilyl groups, alkoxysilyl groups, and multi-alkoxysilyl groups described by formula

provided that at least one chain termination per molecule comprises a multi-alkoxysilyl group, where $R^2$, $R^3$, and Z are as defined above, $R^4$ is independently selected from the group consisting of a silicon atom and a siloxane radical comprising at least two silicon atoms and each Z is bonded to a silicon atom of $R^4$ with the remaining valences of the silicon atoms of $R^4$ being bonded to a hydrogen atom, a monovalent hydrocarbon radical comprising 1 to about 18 carbon atoms, or forming siloxane bonds, n is 0, 1, or 2, a is at least 2, and b is 0 or 1, provided, when b is 0, $R^4$ is bonded to the polydiorganosiloxane through a siloxane bond;

(C) an effective amount of a condensation catalyst;

(D) 0 to about 40 weight percent of an alkoxysilane described by formula

where each R is an independently selected monovalent hydrocarbon radical comprising 1 to about 18 carbon atoms, each $R^1$ is an independently selected alkyl radical comprising 1 to about 6 carbon atoms, and z is 0, 1, or 2; and (E) 0 to about 60 weight percent of a filler;

provided that the sum of the weight percents of Components (A) and (B) comprises about 20 to 95 weight percent based on the total weight of the RTV silicone composition.

The polydiorganosiloxanes represented by Component (A) comprise on average at least 1.2 chain terminations per molecule selected from the group consisting of hydroxysilyl groups described by formula (I) and alkoxysilyl groups described by formula (II). The polydiorganosiloxanes may be linear or branched and may be homopolymers, copolymers, or terpolymers. The polydiorganosiloxanes may be a single species or a mixture of different polymers.

The repeating units of the polydiorganosiloxanes include siloxy units such as described by $R^2_s SiO_{(4-s)/2}$, where s is 0, 1, or 2, and each $R^2$ is independently selected from the group consisting of a hydrogen atom and monovalent hydrocarbon radicals comprising 1 to about 18 carbon atoms.

The monovalent hydrocarbon radicals represented by $R^2$ may be substituted or unsubstituted. Examples of monovalent hydrocarbon radicals represented by $R^2$ include alkyl radicals such as methyl, ethyl, hexyl, 3,3,3-trifluoropropyl, chloromethyl, and octadecyl; alkenyl radicals such as vinyl, allyl, and butadienyl; cycloalkyl radicals such as cyclobutyl, cyclopentyl, and cyclohexyl; cycloalkenyl radicals such as cyclopentenyl and cyclohexenyl; aryl radicals such as phenyl and xylyl; aralkyl radicals such as benzyl; and alkaryl radicals such as tolyl. Preferably each $R^2$ is independently selected from the group consisting of a hydrogen atom and monovalent hydrocarbon radicals comprising 1 to about 8 carbon atoms. More preferably each $R^2$ is an independently selected alkyl radical comprising 1 to about 8 carbon atoms. Most preferably each $R^2$ is methyl.

The preferred polydiorganosiloxanes of Component (A) comprise repeating siloxy units described by —$(R^2_2 SiO)_h$—, where $R^2$ is as described above and h is a value such that the polyorganosiloxanes have a viscosity within a range of about 0.5 to 3000 Pa·s at 25° C. and more preferably within a range of about 5 to 200 Pa·s at 25° C.

The polydiorganosiloxanes of Component (A) comprise on average at least 1.2 chain terminations per molecule selected from the group consisting of hydroxysilyl groups described by formula (I), ie. —$SiR^2_2 OH$ and alkoxysilyl groups described by formula (II), ie. —$Z_y$—$SiR^2_x (OR^3)_{3-x}$. Preferably, the polydiorganosiloxanes of Component (A) comprise on average at least 1.5 chain terminations per molecule selected from the group consisting of hydroxysilyl groups and alkoxysilyl groups. More preferably the polydiorganosiloxanes of Component (A) comprise on average at least 1.5 alkoxysilyl groups.

In formulas (I) and (II), each $R^2$ is independently selected from the group consisting of a hydrogen atom and monovalent hydrocarbon radicals comprising 1 to about 18 carbon atoms. Examples of the monovalent hydrocarbon radicals represented by $R^2$ are as described above.

In formula (II), each $R^3$ is an independently selected alkyl radical comprising 1 to about 8 carbon atoms. Examples of $R^3$ include methyl, ethyl, n-propyl, isopropyl, n-butyl, sec-butyl, iso-butyl, t-butyl, hexyl and octyl. Preferably, each $R^3$ is an independently selected alkyl radical comprising 1 to about 4 carbon atoms. More preferably each $R^3$ is independently selected from the group consisting of methyl and ethyl.

In formula (II), each Z is selected from the group consisting of divalent hydrocarbon radicals comprising about 2 to 18 carbon atoms and a combination of divalent hydrocarbon radicals and siloxane segments described by formula

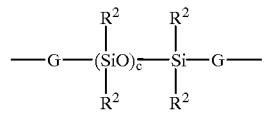

where $R^2$ is as defined above; each G is an independently selected divalent hydrocarbon radical comprising about 2 to 18 carbon atoms, and c is a whole number from 1 to about 6.

The divalent hydrocarbon radicals represented by Z and G may be substituted or unsubstituted. Examples of the divalent hydrocarbon radicals comprising about 2 to 18 carbon atoms represented by Z and G include alkylene radicals such as ethylene, methylmethylene, propylene, butylene, pentylene, hexylene, chloromethylene, and octadecylene; alkenylene radicals such as vinylene, allylene, and butadienylene; cycloalkylene radicals such as cyclobutylene, cyclopentylene, and cyclohexylene; cycloalkenylene radicals such as cyclopentenylene, and cyclohexenylene; arylene radicals such as phenylene and xylylene; aralkylene radicals such as benzylene; and alkarylene radicals such as tolylene.

When Z is a combination of divalent hydrocarbon radicals and siloxane segments as described above, each G is preferably an alkylene radical, and each G is more preferably an alkylene radical comprising about 2 to 8 carbon atoms. Preferably, Z is a divalent hydrocarbon radical comprising about 2 to 18 carbon atoms. It is more preferred for Z to be an alkylene radical, and an alkylene radical comprising about 2 to 8 carbon atoms is most preferred. When Z or G is an alkylene radical comprising 2 carbon atoms, Z or G may be either —$CH_2CH_2$— or —$CH(CH_3)$—. The inventors have observed that the cure rate and green strength of a sealant will vary depending on which isomer comprises the Z or G group of the polymer used in making the sealant. For example, sealants using polymers containing primarily the —$CH(CH_3)$— isomer for the Z or G group, will have slower cure rates and decreased green strength as compared with similar sealants using polymers containing primarily the —$CH_2CH_2$— isomer for the Z or G group.

Subscript y in formula (II) is 0 or 1 and preferably is 1.

Subscript x in formula (II) is 0 or 1, and preferably is 0.

Since the polydiorganosiloxanes of Component (A) are required to have on average at least 1.2 chain terminations per molecule selected from the group consisting of hydroxysilyl groups and alkoxysilyl groups, some polydiorganosiloxanes may contain other types of chain terminations. Preferably, this other type of chain termination comprises an organosilyl group described by the formula $R^5_3 Si$—, where each $R^5$ is an independently selected monovalent hydrocarbon radical comprising 1 to about 18 hydrocarbon radicals. Examples of monovalent hydrocarbon radicals comprising 1 to about 18 carbon atoms are as described above for $R^2$. Preferably $R^5$ is a monovalent hydrocarbon radical comprising 1 to about 8 carbon atoms with a monovalent hydrocarbon radical comprising 1 to about 4 carbon atoms being most preferred. Examples of such useful organosilyl chain terminations include trimethylsilyl, triethylsilyl, vinyldimethylsilyl, and vinylmethylphenylsilyl.

The polydiorganosiloxanes of Component (A) useful in the present invention are well known in the art and are illustrated by Ceyzeriat et al., U.S. Pat. No. 3,151,099; Brown et al., U.S. Pat. No. 3,161,614; Weyenberg, U.S. Pat. No. 3,175,993 and U.S. Pat. No. 3,334,067; Klosowski et al., U.S. Pat. No. 4,871,827; Kamis et al., U.S. Pat. No. 4,898,910; and Chu et al., U.S. Pat. No. 4,956,435; all of which are hereby incorporated by reference to show the polymers and their methods of preparation.

The amount of Component (A) useful in the present invention is from 0 to about 85 weight percent based on the total weight of the RTV silicone composition.

The polydiorganosiloxanes represented by Component (B) comprise on average at least 1.2 chain terminations per molecule selected from the group consisting of hydroxysilyl groups described by formula (1), ie. —$SiR^2_2OH$, alkoxysilyl groups described by formula (II), ie. —$Z_y$—$SiR^2_x(OR^3)_{3-x}$, and multi-alkoxysilyl groups described by formula (III), ie. —$Z_b$—$R^4(Z$—$SiR^2_n(OR^3)_{3-n})_a$, provided that at least one chain termination per molecule comprises a multi-alkoxysilyl group, where Z, $R^2$, $R^3$, y, and x are as defined above and $R^4$, a, b, and n are as described below.

The polydiorganosiloxanes of Component (B) may be linear or branched and may be homopolymers, copolymers, or terpolymers. The polydiorganosiloxanes may be a single species or a mixture of different polymers. The repeating units of the polydiorganosiloxanes of Component (B) include siloxy units such as described by $R^2_sSiO_{(4-s)/2}$, where s and $R^2$ are as defined above. The preferred polydiorganosiloxanes of Component (B) comprise repeating siloxy units described by —$(R^2_2SiO)_h$—, where $R^2$ and h are as defined above.

In formula (III), $R^4$ is selected from the group consisting of a silicon atom and a siloxane radical comprising at least two silicon atoms and each Z group is bonded to a silicon atom of $R^4$ with the remaining valences of the silicon atoms of $R^4$ being bonded to a hydrogen atom, a monovalent hydrocarbon radical comprising 1 to about 18 carbon atoms, or forming siloxane bonds. The siloxane radical represented by $R^4$ may have a linear, branched, resinous, or cyclic structure. In preferred embodiments, $R^4$ is selected from the group consisting of a silicon atom and a siloxane radical comprising at least two silicon atoms described by formula $$(R^2_3SiO_{1/2})_d(R^2_2SiO_{2/2})_e(R^2SiO_{3/2})_f(SiO_{4/2})_g \quad \text{(IV)}$$

where $R^2$ is as defined above and the sum of d+e+f+g is in a range from 2 to about 50, provided that at least two $R^2$ groups are replaced by Z groups of the chain termination group as described by formula (III), since it is required that each such Z group is bonded to a silicon atom of $R^4$. In more preferred embodiments, $R^4$ is selected from the group consisting of a silicon atom and a siloxane radical comprising at least two silicon atoms described by formula (IV) where d is an integer from 0 to 5, e is an integer from 0 to 30, f is an integer from 0 to 5, g is an integer from 0 to 5, the sum of d+e+f+g is greater than 2, and provided that at least 2 $R^2$ groups are replaced by Z groups of the chain termination group as described by formula (III).

In formula (III), subscript n is 0, 1, or 2 and is preferably 0 or 1.

In formula (III), subscript a is at least 2 and is preferably from 2 to about 8.

In formula (III), subscript b is 0 or 1, provided, when b is 0, $R^4$ is bonded to the polyorganosiloxane through a siloxane bond.

The polydiorganosiloxanes represented by Component (B) comprise on average at least 1.2 chain terminations per molecule selected from the group consisting of hydroxysilyl groups, alkoxysilyl groups, and multi-alkoxysilyl groups, provided at least one chain termination per molecule comprises a multi-alkoxysilyl group. Preferably, the polydiorganosiloxanes of Component (B) comprise on average at least 1.5 chain terminations per molecule selected from the group consisting of hydroxysilyl groups, alkoxysilyl groups, and multi-alkoxysilyl groups, provided at least 1 chain termination per molecule is a multi-alkoxysilyl group. It is most preferred that each polydiorganosiloxane chain termination of Component (B) comprises a multi-alkoxysilyl group.

Since the polydiorganosiloxanes of Component (B) are required to have on average at least 1.2 chain terminations selected from the group consisting of hydroxysilyl groups, alkoxysilyl groups, and multi-alkoxysilyl groups, provided at least one chain termination per molecule comprises a multi-alkoxysilyl groups, some polydiorganosiloxanes may contain other types of chain terminations. Preferably, this other type of chain termination comprises an organosilyl chain termination described by formula $R^5_3Si$—, where each $R^5$ is as defined above.

Polydiorganosiloxanes of Component (B) comprising on average at least 1.2 chain terminations per molecule selected from the group consisting of hydroxysilyl groups, alkoxysilyl groups, and multi-alkoxysilyl groups, provided at least one chain termination per molecule comprises a multi-alkoxysilyl group, may be prepared, for example, by the methods described in Krahnke, et al. "Polyorganosiloxanes Having at Least One Organofunctional Group with Multiple Hydrolyzable Groups," U.S. Ser. No. 09/217,477, now U.S. Pat. No. 6,127,502, which is herein incorporated by reference.

Examples of preferred multi-alkoxysilyl groups useful in the present invention are described by formulas

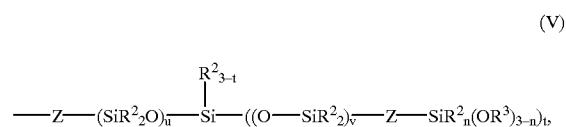

and

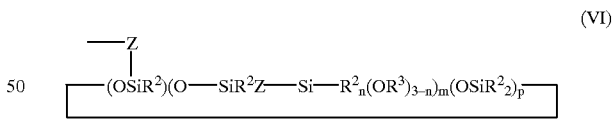

where $R^2$, $R^3$, Z, and n are as described above.

In formula (V), subscript t is 2 or 3.

In formula (V), subscript u is an integer from 0 to 5. Preferably, subscript u is an integer from 0 to 1.

In formula (V), subscript v is an integer from 0 to 5. Preferably, subscript v is an integer from 0 to 1.

In formula (VI), subscript m is an integer from 2 to 7. Preferably, subscript m is an integer from 2 to 4.

In formula (VI), subscript p is an integer from 0 to 6. Preferably, subscript p is an integer from 0 to 3.

In addition, in formula (VI), m+p is a whole number from 2 to 8. Preferably, m+p is a whole number from 2 to 5.

The amount of component (B) useful in the present invention is from about 10 to 95 weight percent based on the total weight of the RTV silicone composition.

To ensure acceptable rheology and mechanical properties the sum of the weight percents of Components (A) and (B) should comprise about 20 to 95 weight percent of the total weight of the RTV silicone composition. In addition, it is preferable that the molar ratio of Component (B) to Component (A) is greater than 1 to 1. More preferably, the molar ratio of Component (B) to Component (A) is greater than 1 to 1. Most preferably, the molar ratio of Component (B) to Component (A) is greater than 10 to 1.

The RTV silicone compositions of the present invention also comprise a condensation catalyst (C). The condensation catalyst can be any of those known to be useful for facilitating crosslinking in silicone sealant compositions. The condensation catalyst may include metal and non-metal condensation catalysts. Examples of the metal portion of the metal condensation catalysts useful in the present invention include titanium, tin, zirconium, lead, iron, cobalt, antimony, manganese, bismuth, and zinc compounds.

The titanium compounds useful for facilitating crosslinking in silicone sealant compositions include: tetraalkyltitanates such as tetraisopropyltitanate, tetra-n-butyltitanate, tetraoctyltitanate, tetra-tertiary-butyltitanate, tetra-tertiary-amyltitanate, and other tetraalkyltitanates such as described in U.S. Pat. No. 5,733,996; chelated titanates such as dialkoxyacetylacetonate titanate chelate and dialkoxyethylacetoacetate titanate chelate, where the alkoxy group includes isopropoxy or isobutoxy, and other chelated titanates such as described in U.S. Pat. Nos. 3,708,467 and 3,779,986; organosiloxytitanium compounds such as described in U.S. Pat. No. 3,334,067; and beta-dicarbonyl titanium compounds such as described in U.S. Pat. No. 3,334,067, each of these patents being herein incorporated by reference to show titanium compounds and methods of manufacture; and other titanium compounds such as $(CH_3CH_2CH_2O)_3TiOTi(OCH_2CH_2CH_3)_3$ and
$(CH_3CH_2CH_2CH_2O)_3TiOTi(OCH_2CH_2CH_2CH_3)_3$.

The tin compounds useful for facilitating crosslinking in silicone sealant compositions include: non-chelated tin compounds such as dibutyltindilaurate, dibutyltindiacetate, dibutyltindimethoxide, carbomethoxyphenyl tin trisuberate, tin octoate, isobutyl tin triceroate, dimethyl tin dibutyrate, dimethyl tin di-neodecanoate, triethyl tin tartrate, dibutyl tin dibenzoate, tin oleate, tin naphthenate, dibutylbis(triethoxysiloxy)tin, butyltintri-2-ethylhexoate, and tinbutyrate; and chelated tin compounds such as di(n-butyl)tinbis(acetylacetonate), di(n-butyl)tinbis(benzoylacetonate), di(ethyl)tinbis(lauroylacetonate), di(methyl)tinbis(pivaloylacetonate), di(n-octyl)tinbis(acetylacetonate), di(n-propyl)tinbis(1,1,1-trifluoroacetylacetonate); di(n-butyl)tinbis(ethylacetoacetate), di-N-butyltinbis(benzotriazole) and di(n-butyl)tin(acetylacetonate)(ethylacetoacetate). Other examples of tin compounds may be found in U.S. Pat. No. 5,213,899, U.S. Pat. No. 4,554,338, U.S. Pat. No. 4,956,436, and U.S. Pat. No. 5,489,479; each of these patents being herein incorporated by reference to show tin compounds and methods of manufacture.

Zirconium compounds useful for facilitating crosslinking in silicone sealant compositions include zirconium octoate and tetra-n-butoxy zirconium and tetra-n-propoxy zirconium.

Further examples of metal condensation catalysts useful for facilitating crosslinking in silicone sealant compositions include: lead 2-ethyloctoate; iron 2-ethylhexoate; cobalt 2-ethylhexoate; manganese 2-ethylhexoate; zinc 2-ethylhexoate; antimony octoate; bismuth naphthenate; zinc naphthenate; zinc stearate.

Examples of nonmetal condensation catalysts useful for facilitating crosslinking in silicone sealant compositions include: hexylammonium acetate and benzyltrimethylammonium acetate.

It is preferred that the condensation catalyst is a metal condensation catalyst. Preferred metal condensation catalysts are selected from the group consisting of titanium compounds and tin compounds. Preferred titanium compounds are selected from the group consisting of tetraalkyltitanates and chelated titanates. Preferred tin compounds are selected from the group consisting of dibutyltindiacetate and dibutyltinbis(2,4-pentanedionate).

As defined herein, an effective amount of a condensation catalyst is that amount which facilitates crosslinking in silicone sealant compositions. This amount may vary depending on the particular condensation catalyst chosen. Generally, an amount from about 0.001 to 5 weight percent based on the total weight of the RTV silicone composition will be effective. When using a titanium compound, it is preferred to use about 0.05 to 5 weight percent based on the total weight of the RTV silicone composition; with from about 0.05 to 2 weight percent on the same basis being more preferred. When using a tin compound, it is preferred to use about 0.001 to 1 weight percent based on the total weight of the RTV silicone composition; with from about 0.01 to 0.8 weight percent on the same basis being more preferred. The condensation catalyst may be added as a single species or as a mixture of two or more species.

The RTV silicone compositions of the present invention may also comprise an alkoxysilane (D) described by formula $R_zSi(OR^1)_{4-z}$, where each R is an independently selected monovalent hydrocarbon radical comprising from 1 to about 18 carbon atoms, each $R^1$ is an independently selected alkyl radical comprising 1 to about 6 carbon atoms, and z is 0, 1, or 2.

Examples of the monovalent hydrocarbon radicals comprising from 1 to about 18 carbon atoms represented by R are as described above for $R^2$. Preferably, each R is an independently selected monovalent hydrocarbon radical comprising 1 to about 8 carbon atoms. More preferably each R is an independently selected monovalent hydrocarbon radical comprising 1 to about 4 carbon atoms.

Examples of the alkyl radicals comprising 1 to about 6 carbon atoms represented by $R^1$ include methyl, ethyl, propyl, and butyl. Preferably, each $R^1$ is selected from the group consisting of alkyl radicals comprising 1 to about 4 carbon atoms. More preferably $R^1$ is methyl or ethyl.

Subscript z can be 0, 1, or 2. Preferably z is 1 or 2.

Examples of useful alkoxysilanes include methyltrimethoxysilane, methyltriethoxysilane, vinyltrimethoxysilane, phenyltrimethoxysilane, dodecyltrimethoxysilane, vinyltriethoxysilane, ethyltrimethoxysilane, ethyltriethoxysilane, dimethyldimethoxysilane, vinylmethyldimethoxysilane, dimethyldiethoxysilane, ethylmethyldiethoxysilane and tetraethoxysilane.

The amount of Component (D) useful in the present invention is from 0 to about 40 weight percent based on the total weight of the RTV silicone composition. Preferably, the Component (D) is added in amounts from about 0.5 to 10 weight percent on the same basis. Persons skilled in the art will understand that the specific amount of alkoxysilane needed will vary depending on the RTV silicone composition's components and the physical properties desired, i.e. cure speed and shelf stability. The alkoxysilane may be a single species or a mixture of two or more species.

The RTV silicone compositions of the present invention may also comprise a filler (E). The filler useful in the present invention is a filler which is selected from those known to be useful in RTV silicone sealants. The fillers include ground, precipitated, and colloidal calcium carbonates which are untreated or treated with compounds such as stearate or stearic acid; reinforcing silicas such as fumed silicas, precipitated silicas, silica gels, and hydrophobed silicas and silica gels; crushed quartz, ground quartz, alumina, aluminum hydroxide, titanium dioxide, diatomaceous earth, iron oxide, carbon black, and graphite. Preferably, the filler is a silica filler, a calcium carbonate filler, or a mixture thereof.

The type and amount of filler added depends upon the physical properties desired for the cured RTV silicone composition. The amount of filler useful in the present invention is from 0 to about 60 weight percent based on the total weight of the RTV silicone composition. Preferably, the filler is added in amounts from about 5 to 50 weight percent on the same basis. The filler may be a single species or a mixture of two or more species.

One preferred embodiment of the present invention comprises a RTV silicone composition, curable in the presence of moisture, comprising (A) 0 to about 85 weight percent polydiorganosiloxanes comprising on average at least 1.2 chain terminations per molecule selected from the group consisting of hydroxysilyl groups described by formula $$—SiR^2{}_2OH, \quad (I)$$

and alkoxysilyl groups described by formula $$—Z_y—SiR^2{}_x(OR^3)_{3-x}, \quad (II)$$

where each $R^2$ is independently selected from the group consisting of a hydrogen atom and monovalent hydrocarbon radicals comprising 1 to about 18 carbon atoms, each $R^3$ is an independently selected alkyl radical comprising 1 to about 8 carbon atoms, each Z is independently selected from the group consisting of divalent hydrocarbon radicals comprising about 2 to 18 carbon atoms and a combination of divalent hydrocarbon radicals and siloxane segments described by formula

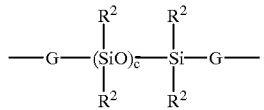

where $R^2$ is as defined above, each G is an independently selected divalent hydrocarbon radical comprising about 2 to 18 carbon atoms, and c is a whole number from 1 to about 6, x is 0 or 1, and y is 0 or 1;

(B) about 10 to 95 weight percent polydiorganosiloxanes comprising on average at least 1.2 chain terminations per molecule selected from the group consisting of hydroxysilyl groups, alkoxysilyl groups, and multi-alkoxysilyl groups described by formula $$—Z_b—R^4(Z—SiR^2{}_n(OR^3)_{3-n})_a \quad (III)$$

provided that at least one chain termination per molecule comprises a multi-alkoxysilyl group, where $R^2$, $R^3$, and Z are as defined above, $R^4$ is independently selected from the group consisting of a silicon atom and a siloxane radical comprising at least two silicon atoms and each Z is bonded to a silicon atom of $R^4$ with the remaining valences of the silicon atoms of $R^4$ being bonded to a hydrogen atom, a monovalent hydrocarbon radical comprising 1 to about 18 carbon atoms, or forming siloxane bonds, n is 0, 1, or 2, a is at least 2, and b is 0 or 1, provided, when b is 0, $R^4$ is bonded to the polydiorganosiloxane through a siloxane bond;

(C) about 0.05 to 5 weight percent of a condensation catalyst comprising a titanium compound;

(D) 0 to about 40 weight percent of an alkoxysilane described by formula $$R_zSi(OR^1)_{4-z},$$

where each R is an independently selected monovalent hydrocarbon radical comprising 1 to about 18 carbon atoms, each $R^1$ is an independently selected alkyl radical comprising 1 to about 6 carbon atoms, and z is 0, 1, or 2; and (E) 0 to about 60 weight percent of a filler;

provided that the sum of the weight percents of Components (A) and (B) comprises about 20 to 95 weight percent based on the total weight of the RTV silicone composition.

In this preferred embodiment, Components (A), (B), (D), and (E) are as described above, and the condensation catalyst (Component (C)) is a titanium compound.

Another preferred embodiment of the present invention comprises a RTV silicone composition curable in the presence of moisture, comprising (A) 0 to about 85 weight percent polydiorganosiloxanes comprising on average at least 1.2 chain terminations per molecule selected from the group consisting of hydroxysilyl groups described by formula $$—SiR^2{}_2OH, \quad (I)$$

and alkoxysilyl groups described by formula $$—Z_y—SiR^2{}_x(OR^3)_{3-x}, \quad (II)$$

where each $R^2$ is independently selected from the group consisting of a hydrogen atom and monovalent hydrocarbon radicals comprising 1 to about 18 carbon atoms, each $R^3$ is an independently selected alkyl radical comprising 1 to about 8 carbon atoms, each Z is independently selected from the group consisting of divalent hydrocarbon radicals comprising about 2 to 18 carbon atoms and a combination of divalent hydrocarbon radicals and siloxane segments described by formula

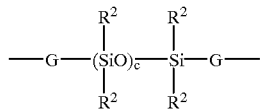

where $R^2$ is as defined above, each G is an independently selected divalent hydrocarbon radical comprising about 2 to 18 carbon atoms, and c is a whole number from 1 to about 6, x is 0 or 1, and y is 0 or 1;

(B) about 10 to 95 weight percent polydiorganosiloxanes comprising on average at least 1.2 chain terminations per molecule selected from the group consisting of hydroxysilyl groups, alkoxysilyl groups, and multi-alkoxysilyl groups described by formula $$—Z_b—R^4(Z—SiR^2{}_n(OR^3)_{3-n})_a \quad (III)$$

provided that at least one chain termination per molecule comprises a multi-alkoxysilyl group, where $R^2$, $R^3$, and Z are as defined above, $R^4$ is independently selected from the group consisting of a silicon atom and a siloxane radical comprising at least two silicon atoms and each Z is bonded to a silicon atom of $R^4$ with the remaining valences of the silicon atoms of $R^4$ being bonded to a hydrogen atom, a monovalent hydrocarbon radical comprising 1 to about 18 carbon atoms, or forming siloxane bonds, n is 0, 1, or 2, a is at least 2, and b is 0 or 1, provided, when b is 0, $R^4$ is bonded to the polydiorganosiloxane through a siloxane bond;

(C) about 0.001 to 1 weight percent of a condensation catalyst comprising a tin compound;

(D) 0 to about 40 weight percent of an alkoxysilane described by formula $$R_z Si(OR^1)_{4-z},$$

where each R is an independently selected monovalent hydrocarbon radical comprising 1 to about 18 carbon atoms, each $R^1$ is an independently selected alkyl radical comprising 1 to about 6 carbon atoms, and z is 0, 1, or 2;

(E) 0 to about 60 weight percent of a filler;

(F) 0 to about 5 weight percent of a cure accelerator; and (G) 0 to about 10 weight percent of a scavenger;

provided that the sum of the weight percents of Components (A) and (B) comprises about 20 to 95 weight percent based on the total weight of the RTV silicone composition.

In this preferred embodiment, Components (A), (B), (D), and (E) are as described above, the condensation catalyst (Component (C)) is a tin compound, and Components (F) and (G) are as described below.

Component (F) in this preferred embodiment comprises a cure accelerator (F). Useful cure accelerators can be any cure accelerator that is known in the art. A cure accelerator as defined herein means any compound that significantly increases the cure rate of a RTV silicone composition when added to a composition along with a condensation catalyst.

Examples of compounds useful as cure accelerators in the present RTV silicone compositions include substituted guanidines, diorganosulfoxides, imidizoles, amidines, and amines, which are disclosed, for example, in U.S. Pat. Nos. 4,477,625; 4,395,526; 4,472,564; 4,499,230; 4,517,337; 4,180,642; and 4,248,993, all of which are herein incorporated by reference.

Examples of substituted guanidines include silyl substituted guanidines having the formula, $$(Z')_{g'} Si(OR^6)_{4-g'}, \quad (VII)$$

where each $R^6$ is independently selected from the group consisting of alkyl radicals comprising 1 to about 8 carbon atoms and aralkyl radicals comprising 7 to about 13 carbon atoms, Z' is a guanidine radical of the formula $(R^7{}_2N)(R^8{}_2N)C{=}N{-}R^9{-}$, where $R^9$ is a divalent hydrocarbon radical comprising 2 to about 8 carbon atoms, $R^7$ and $R^8$ are each independently selected from the group consisting of hydrogen atoms and alkyl radicals comprising 1 to about 8 carbon atoms; and g' is an integer from 1 to 3. In addition, alkyl substituted guanidines having the formula, $(R^7{}_2N)(R^8{}_2N)C{=}N{-}R^{10}$, where $R^7$ and $R^8$ are as previously defined and $R^{10}$ is an alkyl radical comprising 1 to about 8 carbon atoms, also can be employed. These and other silyl substituted guanidines are further described in U.S. Pat. Nos. 4,180,642; 4,248,993; and 4,395,526 which have already been incorporated by reference.

Examples of diorganosulfoxides include dimethylsulfoxide, methylethylsulfoxide, butylpropylsulfoxide, diphenylsulfoxide, dibenzylsulfoxide, tetramethylenesulfoxide, and others described in U.S. Pat. No. 4,472,564 which has already been incorporated by reference.

Examples of imidazoles include N,N,N',N',-tetramethyl-1,3,-diaminopropane imidazole, N-methyl imidazole, N-methyl-2-methyl imidazole, and benzimidazole.

Examples of useful amidines include cyclic amidines and non-cyclic amidines having the unit of structure described by formula

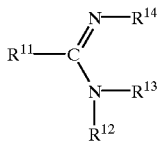

where $R^{11}$ through $R^{14}$ are each independently selected from the group consisting of alkyl radicals comprising 1 to about 8 carbon atoms, alkenyl radicals comprising 1 to about 8 carbon atoms, and aryl radicals comprising 6 to about 13 carbon atoms. When a cyclic amidine is desired, $R^{13}$ and $R^{14}$, or $R^{11}$ and $R^{12}$ can be part of a cycloalkylene structure. In addition, $R^{11}$ through $R^{14}$ can include silicon atoms whose valences can be satisfied by monovalent or polyvalent organic radicals. More specific examples include 2-ethyl-2-imidazoline; N,N-dimethylbenzamidine; N,N-diphenylacetamidine; 1,5-diazabicyclo[4.3.0]non-5-ene (DBN), 1,8-diazabicyclo[5.4.0]undec-7-ene (DBU), and others as described in U.S. Pat. No. 4,477,625, which has already been incorporated by reference.

Various types of amines may also function as cure accelerators in certain compositions, including silylated amines, primary, secondary and tertiary amines and diamines. Examples of silylated amines include N-(2-aminoethyl)-3-aminopropyltrimethoxysilane and methyldimethoxy-di-n-hexylaminosilane. Examples of primary, secondary, and tertiary amines include di-n-hexylamine, dicyclohexylamine, di-n-octylamine, hexamethoxymethylmelamine, dicyclopentamine, di-t-butylamine, and isopropylcyclohexylamine. An example of a diamine is di-t-butylethylene diamine (DBEDA). Other examples of amines are described in U.S. Pat. Nos. 4,477,625; 4,395,526; and 4,472,564; which have already been incorporated by reference.

Preferred cure accelerators are selected from the group consisting of substituted guanidines, amidines, and amines. More preferred cure accelerators are selected from the group consisting of amidines and amines. Most preferred cure accelerators are selected from the group consisting of 1,8-diazabicyclo[5.4.0]undec-7-ene and N-(2-aminoethyl)-3-aminopropyltrimethoxysilane.

The cure accelerator may be added to the present invention in an amount from 0 to about 5 weight percent based on the total weight of the RTV silicone composition. Preferably, the cure accelerator is added in the amount of about 0.01 to 2 based on the total weight of the RTV silicone composition, and more preferably about 0.05 to 1 weight percent on the same basis. The cure accelerator may be a single species or a mixture of two or more species.

Component (G) in this preferred embodiment comprises a scavenger. The scavenger can be any scavenger that is known in the art. A scavenger as defined herein is any compound that will associate with and/or react with free hydroxy groups in the composition.

Examples of scavenger compounds suitable for use in the RTV compositions of the present invention are disclosed, for example, in U.S. Pat. Nos. 4,395,526; 4,417,042; 4,424,157; 4,467,063; 4,471,132; 4,472,551; 4,472,564; 4,483,972; 4,489,191; 4,495,330; 4,495,331; 4,499,229; 4,499,230;

4,499,234; 4,503,209; 4,528,352;4,578,492; 5,244,938; 5,741,839; and 5,777,144, all of which are herein incorporated by reference to show suitable scavengers.

The preferred scavenger for use in the RTV compositions of this invention is selected from the group consisting of a silazane compound having the formula

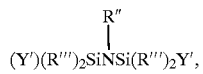
(VIII)

and a cyclosilazane compound having the formula

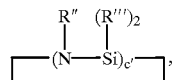
(IX)

where each Y' is independently selected from the group consisting of R'" and R"$_2$N—, R" is selected from the group consisting of hydrogen, monovalent hydrocarbon radicals, and fluoroalkyl radicals, each R'" is independently selected from the group consisting of hydrogen atoms, monovalent hydrocarbon radicals and fluoroalkyl radicals, and c' is an integer from 3 to 6.

Examples of the silazane compounds within formula (VIII) and the cyclosilazane compounds within formula (IX) are disclosed in U.S. Pat. No. 4,417,042, which was previously incorporated by reference herein and include hexamethyldisilazane, hexamethylcyclo-N-methyltrisilazane, hexamethylcyclotrisilazane, octamethyltetrasilazane, trimethyltriphenylcyclotrisilazane, and trivinyltrimethylcyclotrisilazane. Hexamethyldisilazane is the most preferred scavenger.

The scavenger may be added to the present invention in an amount from 0 to about 10 weight percent based on the total weight of the RTV silicone composition. Preferably, the scavenger is present in an amount from about 0.5 to 10 weight percent based on the total weight of the RTV silicone composition. Most preferably, the scavenger is added in an amount to provide an excess over the amount necessary to capture all free hydroxy groups in the composition up to about 10 weight percent on the same basis. The scavenger may be a single species or a mixture of two or more species.

Other ingredients which are conventionally used in RTV silicone compositions such as adhesion promoters, rheology additives, fungicides, colorants, pigments, and plasticizers can be added as long as they do not interfere with the desired properties.

The present RTV silicone composition may be prepared by mixing all the ingredients together in amounts as specified to provide a composition which is stable in the absence of moisture and which cures when exposed to moisture. These compositions are preferably prepared by mixing all the ingredients under anhydrous conditions. This means that the amounts of moisture in the ingredients used should be minimized and that the conditions of mixing should minimize the amounts of moisture allowed into the system. Excess moisture may have deleterious effects on the composition, such as causing curing in the storage package or reduced cured properties.

The present compositions may be prepared as either a one-package system or a two-(or multi) package system. With a one-package system, all the ingredients are mixed together and stored in an anhydrous state. With a two- or multi-package system the ingredients may be stored separately and then mixed prior to use. For convenience, a one-package sealant is preferred.

The RTV silicone compositions of this invention have rapid development of green strength upon exposure to moisture and may be used in any application requiring a RTV silicone sealant in addition to applications requiring rapid development of green strength.

EXAMPLES

This invention is further illustrated by the following examples which are presented for that purpose and are not intended to limit the scope of the claims herein. As used in the examples, Me is methyl and Pr is n-propyl. Viscosities were measured at 25° C. using a Brookfield rheometer. The gas liquid chromatograph used for analysis was a Hewlett Packard 5890 Series II with a flame ionization detector.

Preparation of Polymer 3

203 g (0.686 mol) tris(dimethylsiloxy)-n-propylsilane prepared as described in U.S. Pat. No. 5,446,185 and 5000 ppm of a solution of a platinum vinylsiloxane complex containing 30 ppm platinum metal were heated to 100° C. The heat was then removed and 150 g (1.01 mol) vinyltrimethoxysilane were added dropwise over a period of about 45 min. with sufficient stirring to maintain a pot temperature of approximately 100– 105° C. Analysis of the reaction mixture by gas liquid chromatography showed a yield of approximately 40% of a multi-alkoxysilyl endcapper ("Endcapper A"). The reaction mixture was distilled to yield 141 g of Endcapper A, having the following formula and boiling at 155° C. under 0.5 mm Hg pressure:

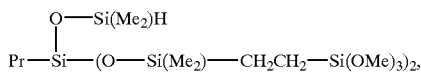

Next, 400 g of a vinyl endblocked polydimethylsiloxane (PDMS) having a viscosity of 65 Pa·s and containing 0.012 mol vinyl and 294 ppm of a solution of a platinum vinylsiloxane complex containing 1.8 ppm platinum metal were mixed for several minutes at 50° C. The heat was removed and 7.72 g (containing 0.012 mol hydrogen) of Endcapper A prepared as described above was then added and mixing continued for 1 hour. The mixture was de-aired under approximately 50 mm Hg vacuum and allowed to react overnight. The vinyl on the PDMS reacted with the SiH on the endcapper and no residual vinyl was found upon testing by FT-IR (Perkin Elmer 1600 Series). Polydimethylsiloxanes endblocked with Endcapper A and having an overall viscosity of approximately 65 Pa·s ("Polymer 3") were formed having the formula:

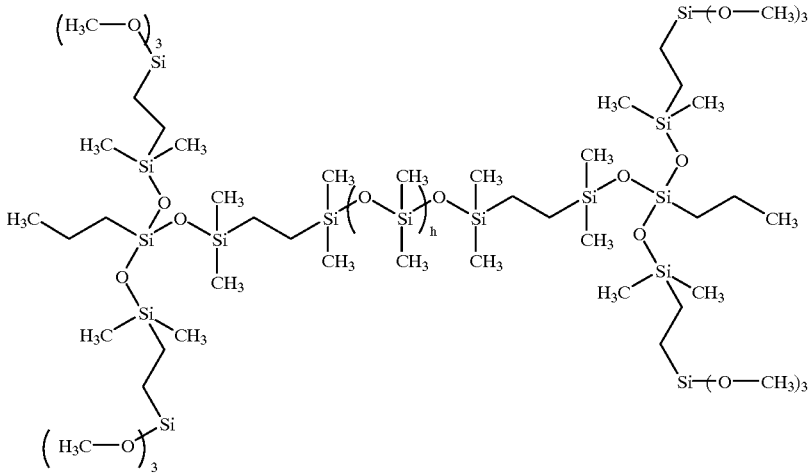

Preparation of Polymer 4

1200 g of a vinyl endblocked PDMS having a viscosity of 65 Pa·s and containing 0.036 mol vinyl and 300 ppm of a solution of a platinum vinylsiloxane complex containing 1.8 ppm platinum metal were mixed for several minutes at 50° C. The heat was removed and 17.46 g (containing 0.029 mol hydrogen) of Endcapper A prepared as described for Polymer 3 was then added and mixing continued for 1 hour. The mixture was de-aired at 50 mm Hg vacuum and allowed to react overnight. The vinyl on the PDMS reacted with the SiH on the endcapper and upon testing, using FT-IR, it was found that approximately 21% of the polymer ends contained residual vinyl. Therefore, a mixture of polydimethylsiloxanes having an overall viscosity of approximately 65 Pa·s ("Polymer 4") was formed comprising polydimethylsiloxanes endblocked with Endcapper A, as described by Polymer 3 above and polydimethylsiloxanes partially endblocked with Endcapper A and partially endblocked with a vinyldimethylsilyl group having the formula

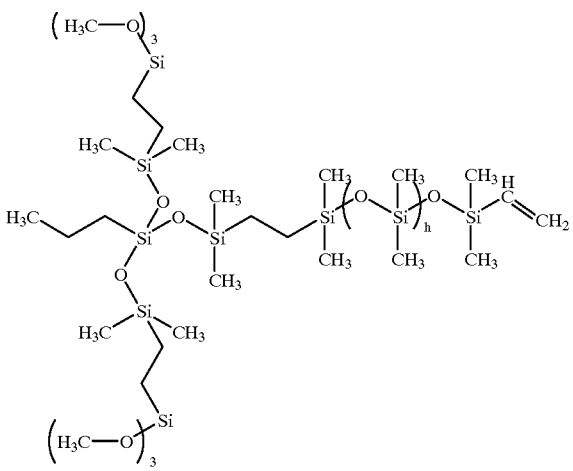

such that in the polydimethylsiloxane mixture approximately 21 percent of the chain terminations were vinyldimethylsilyl chain terminations.

Preparation of Polymer 5

48.1 g (0.2 mol) 1,3,5,7-tetramethylcyclosiloxane (methyl-hydrogen cyclic) and 5000 ppm of a solution of a platinum vinylsiloxane complex containing 30 ppm platinum metal were heated to 100° C. The heat was then removed and 88.9 g (0.6 mol) of vinyltrimethoxysilane were added dropwise over a period of about 45 min. with sufficient stirring to maintain a pot temperature of approximately 100–120° C. Analysis of the reaction mixture by gas liquid chromatography showed a yield of approximately 45% of a cyclic multi-alkoxysilyl endcapper ("Endcapper B"). 17 g of the reaction mixture containing about a 70% pure sample of Endcapper B having the following formula was isolated by distilling at 180° C. under 3.5 mm Hg pressure:

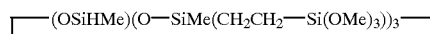

Next, 100 g of a vinyl endblocked PDMS having a viscosity of 65 Pa·s and containing 0.003 mol vinyl and 294 ppm of a solution of a platinum vinylsiloxane complex containing 1.8 ppm platinum metal were mixed for several minutes at 50° C. The heat was removed and 2.75 g of the 70% pure Endcapper B (containing at least 0.003 mol hydrogen) prepared as described above was then added and mixing continued for 1 hour. The mixture was de-aired under approximately 50 mm Hg vacuum and allowed to react overnight. The vinyl on the PDMS reacted with the SiH on the endcapper and no residual vinyl was found upon testing by FT-IR. A mixture of polydimethylsiloxanes having an overall viscosity of approximately 170 Pa·s ("Polymer 5") was formed, primarily comprising polydimethylsiloxanes endblocked with Endcapper B having the formula:

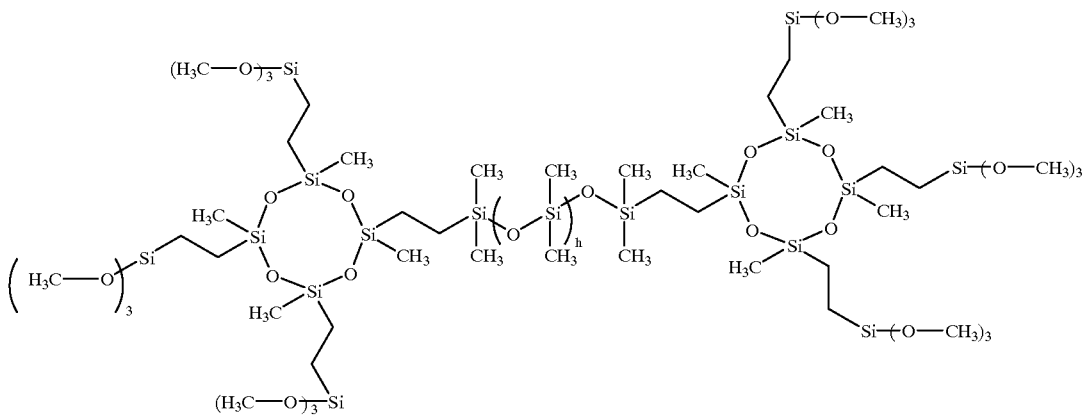

Tensile and Tack-free Time Test Methods

Tensile measurements were generated in accordance with ASTM D412. Tack-Free-Time (TFT) measurements were generated in accordance with ASTM C679 except instead of using a standard weight, similar force was applied.

Green Strength Test Method

Persons skilled in the art commonly use instruments generically known as dynamic mechanical spectrometers for characterizing the strength of a curing composition. In the following examples, green strength was quantified by measuring the shear strength after 30 minutes of sealant cure using a dynamic mechanical spectrometer equipped with a parallel plate sample holder (Rheometrics, model RDS 7700). The measurements were made in accordance with ASTM D2084-95 with the main difference being that the sample holding fixture had smooth plates instead of the ribbed plates used in the ASTM method.

Sealant compositions were pressed between two 25 mm parallel plates such that a gap of 1 mm was obtained between the two parallel plates. After 30 minutes of curing at 23±3° C., 50±5% relative humidity, the shear strength of the sealant was measured by means of a torque transducer at 5% strain and oscillating frequency of 1 rad/s and reported as the green strength in units of pascals, Pa.

Ingredients

Polymer 1: polydimethylsiloxanes comprising polymers described by formula

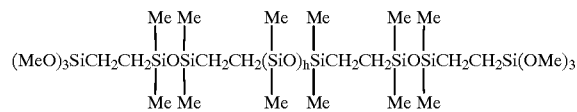

having an overall viscosity of approximately 65 Pa·s.

Polymer 2: a mixture of polydimethylsiloxanes having an overall viscosity of approximately 65 Pa·s comprising Polymer 1 and polymers described by formula

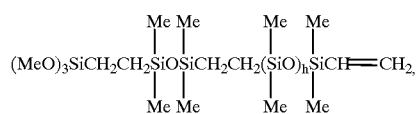

such that in the polydimethylsiloxane mixture approximately 20 percent of the chain terminations were vinyldimethylsilyl groups.

Polymer 3: Polydimethylsiloxanes endblocked with Endcapper A and having an overall viscosity of approximately 65 Pa·s, prepared as described above.

Polymer 4: a mixture of polydimethylsiloxanes having an overall viscosity of approximately 65 Pa·s comprising polydimethylsiloxanes endblocked with Endcapper A, as described by Polymer 3 above and polydimethylsiloxanes partially endblocked with Endcapper A and partially endblocked with a vinyldimethylsilyl group such that in the polydimethylsiloxane mixture approximately 21 percent of the chain terminations were vinyldimethylsilyl groups, prepared as described above.

Polymer 5: a mixture of polydimethylsiloxanes having an overall viscosity of approximately 170 Pa·s, primarily comprising polydimethylsiloxanes endblocked with Endcapper B.

Polymer 6: Polydimethylsiloxanes endblocked with methyldimethoxy groups and having a viscosity of approximately 13 Pa·s. These polymers may be prepared by the method described in U.S. Pat. No. 5,166,296, which is herein incorporated by reference.

Silica Filler: an untreated fumed silica filler having an average surface area of approximately 160±15 $m^2/g$.

Treated Silica: a dimethyldichlorosilane treated fumed silica filler having a surface area of approximately 170±20 $m^2/g$).

Grnd Calcium Carbonate: a ground calcium carbonate treated with stearate and having a particle size of approximately 3 microns.

Ppt Calcium Carbonate: a precipitated calcium carbonate treated with stearate and having a particle size of approximately 0.075 microns.

Rheology Additive: a polyoxypropylene-block-polydimethylsiloxane polymer having a viscosity of approximately 0.2 Pa·s.

DBTDA: dibutyltindiacetate

Tin Chelate: dibutyltinbis(2,4-pentanedionate)

Titanate: a tetra-tertiary butyltitanate

Titanate Chelate: a di(ethylacetoacetate)-diisopropoxy titanate chelate

Adhesion Promoter: a reaction mixture of a 2:1 molar mixture of glycidoxypropyltrimethoxysilane and aminopropyltrimethoxysilane.

Scavenger: hexamethyldisilazane (HMDZ)

Amidine Cure Accelerator: 1,8-Diazabicyclo[5.4.0] undec-7-ene (DBU)

Silylated Amine Cure Accelerator: N-(2-aminoethyl)-3-aminopropyltrimethoxysilane MTM: methyltrimethoxysilane Plasticizer: polydimethylsiloxanes endblocked with trimethylsilyl groups and having a viscosity of approximately 0.1 Pa·s.

Example 1

100 g samples were prepared by addition of amounts of each ingredient as listed in Table 1. MTM, titanate, rheology additive and adhesion promoter, were added to the polymer in a mixer and mixed for 30 seconds. The fillers were added and mixing continued for 150 seconds with approximately 50mm Hg vacuum for the last 30 seconds. The samples were transferred into Semco (R) cartridges, centrifuged to remove any entrained air, and then stored for a minimum of 16 hours at 23±3° C., 50±5% relative humidity prior to green strength testing as described above. See Table 1 for ingredients and testing results.

TABLE 1

Effect on Green Strength of Polymer in RTV Silicone Sealant Having Multi-Alkoxysilyl Chain Terminations

| Ingredients (weight percent) | 1-A* | 1-B |
|---|---|---|
| Polymer 2* | 53% | 0 |
| Polymer 4 | 0 | 53% |
| Grnd Calcium Carbonate | 40% | 40% |
| Silica Filler | 3.5% | 3.5% |
| Titanate | 1.75% | 1.75% |
| MTM | 0.75% | 0.75% |
| Rheology Additive | 0.5% | 0.5% |
| Adhesion Promoter | 0.5% | 0.5% |
| Green Strength (Pa) | 426.8 | 783.7 |

*Comparative Example

Example 2

Two sealants were prepared and tested as described in Example 1. In addition, TFT was measured. See Table 2 for ingredients and testing results.

TABLE 2

Effect on Green Strength of Polymer in RTV Silicone Sealant Having Multi-Alkoxysilyl Chain Terminations

| Ingredients (weight percent) | 2-A* | 2-B |
|---|---|---|
| Polymer 1* | 56% | 0 |
| Polymer 3 | 0 | 56% |
| Ppt. Calcium Carbonate | 35% | 35% |
| Grnd Calcium Carbonate | 5% | 5% |
| Titanate Chelate | 1% | 1% |
| MTM | 2.5% | 2.5% |
| Adhesion Promoter | 0.5% | 0.5% |
| Green Strength (Pa) | 311.6 | 872.5 |
| TFT (min) | 21 | 11 |

*Comparative Example

Example 3

Three sealants were prepared and tested as described in Example 1 except they were packaged in glass jars and TFT and tensile strength were measured. See Table 3 for ingredients and testing results.

TABLE 3

Effect on Green Strength of Polymer in RTV Silicone Sealant Having Multi-Alkoxysilyl Chain Terminations

| Ingredients (weight percent) | 3-A* | 3-B | 3-C |
|---|---|---|---|
| Polymer 1* | 86% | 0 | 0 |
| Polymer 3 | 0 | 86% | 0 |

TABLE 3-continued

Effect on Green Strength of Polymer in RTV Silicone Sealant Having Multi-Alkoxysilyl Chain Terminations

| Ingredients (weight percent) | 3-A* | 3-B | 3-C |
|---|---|---|---|
| Polymer 5 | 0 | 0 | 86% |
| Silica Filler | 8% | 8% | 8% |
| Titanate | 2% | 2% | 2% |
| MTM | 4% | 4% | 4% |
| Green Strength (Pa) | 75.5 | 360.7 | 560.9 |
| TFT (min) | 45 | 6–8 | 4 |
| Tensile (MPa) | 1.74 | 1.47 | 1.43 |

*Comparative Example

Example 4

100 g samples of 4A and 4F were prepared by addition of amounts of each ingredient as listed in Table 4. MTM and titanate were added to the polymer and mixed for 120 seconds. The fillers were added and mixing continued for 120 seconds. Then the mixer walls and blades were wiped down with a spatula to insure homogeneity. Mixing was continued for 120 seconds with approximately 50 mm Hg vacuum for the last 30 seconds. These materials were then packaged into glass jars. Samples 4-B, 4-C, 4-D, and 4-E were each prepared by blending various ratios of composition 4A with 4F using a Hauschild dental paste mixer. The resulting mixtures were packaged into 20 ml syringes, stored for 72 hours at 23±3° C., 50±5% relative humidity and tested for green strength as described above.

TABLE 4

Effect on Green Strength of Polymer in RTV Silicone Sealant Having Multi-Alkoxysilyl Chain Terminations

| Ingredients (weight percent) | 4-A* | 4-B | 4-C | 4-D | 4-E | 4-F |
|---|---|---|---|---|---|---|
| Polymer 1 | 86 | 67.1 | 55.1 | 41.2 | 17 | 0 |
| Polymer 3 | 0 | 18.9 | 30.9 | 44.8 | 69 | 86 |
| Silica Filler | 8 | 8 | 8 | 8 | 8 | 8 |
| Titanate | 2 | 2 | 2 | 2 | 2 | 2 |
| MTM | 4 | 4 | 4 | 4 | 4 | 4 |
| Mole % Multi-Alkoxysilyl Polymer Ends | 0 | 22 | 35.9 | 52.1 | 80.2 | 100 |
| Green Strength (Pa) | 56.7 | 83.1 | 124.6 | 185.1 | 341.8 | 543.9 |

*Comparative Example

Example 5

100 g samples were prepared based on the formulation listed in Table 5. A premix of DBTDA and MTM was added to polymer in a mixer, followed by the addition of HMDZ scavenger, and then mixed for 30 seconds with approximately 50 mm Hg vacuum at the end of 5 seconds. Treated Silica filler was added, and the mixing continued for approximately 210 seconds (till the complete wetting of the filler) with approximately 50 mm Hg vacuum at the end of 30 seconds. The samples were quickly transferred into Semco (R) cartridges, centrifuged to remove any entrained air, and then stored for a minimum of 16 hours at 23±3° C., 50±5% relative humidity prior to green strength testing as described above. The composition and testing results are summarized in Table 5.

TABLE 5

Effect of Polymer Containing Multi-Alkoxysilyl Chain Terminations on Green Strength of RTV Silicone Sealant.

| Ingredients (wt. %) | 5-A* | 5-B* | 5-C |
|---|---|---|---|
| Polymer 6* | 83.7% | 0 | 0 |
| Polymer 1* | 0 | 83.7% | 0 |
| Polymer 3 | 0 | 0 | 83.7% |
| Treated Silica | 12% | 12% | 12% |
| DBTDA | 0.3% | 0.3% | 0.3% |
| Scavenger | 2% | 2% | 2% |
| MTM | 2% | 2% | 2% |
| Green Strength (Pa) | 43.6 | 223.9 | 475.8 |

*Comparative Examples

Example 6

100 g samples were prepared based on the formulation listed in Table 6. A premix of tin chelate and MTM was added to polymer in a mixer, and then mixed for 30 seconds with approximately 50 mm Hg vacuum at the end of 5 seconds. Treated silica filler was added, and the mixing continued for approximately 210 seconds (till the complete wetting of the filler) with approximately 50 mm Hg vacuum at the end of 30 seconds. The samples were packaged, centrifuged, stored and tested as described in Example 5. The composition and testing results are summarized in Table 6.

TABLE 6

Effect on Green Strength of Polymer in RTV Silicone Sealant Having Multi-Alkoxysilyl Chain Terminations

| Ingredients (wt. %) | 6-A* | 6-B* | 6-C |
|---|---|---|---|
| Polymer 6* | 83.7% | 0 | 0 |
| Polymer 1* | 0 | 83.7% | 0 |
| Polymer 3 | 0 | 0 | 83.7% |
| Treated Silica | 12% | 12% | 12% |
| Tin Chelate | 0.3% | 0.3% | 0.3% |
| MTM | 2% | 2% | 2% |
| Green Strength (Pa) | 175.7 | 378.2 | 689.3 |

*Comparative Examples

Example 7

100 g samples were prepared based on ingredients listed in Table 7. A pre-mix of MTM and HMDZ scavenger was added to polymer in a mixer, and then mixed for 30 seconds with approximately 50 mm Hg vacuum at the end of 5 seconds. Treated silica filler was added, and the mixing continued for approximately 180 seconds (till the complete wetting of the filler). After that, DBTDA and a cure accelerator (DBU) were added and mixed for approximately 90 seconds with approximately 50 mm Hg vacuum at the end of 30 seconds. The samples were packaged, centrifuged, stored and tested as described in Example 5. The composition and testing results are summarized in Table 7.

TABLE 7

Effect on Green Strength of Polymer in RTV Silicone Sealant Having Multi-Alkoxysilyl Chain Terminations

| Ingredients (wt. %) | 7-A* | 7-B* | 7-C |
|---|---|---|---|
| Polymer 6* | 83.4% | 0 | 0 |
| Polymer 1* | 0 | 83.4% | 0 |
| Polymer 3 | 0 | 0 | 83.4% |
| Treated Silica | 12% | 12% | 12% |
| DBTDA | 0.3% | 0.3% | 0.3% |
| Amidine Cure Accelerator | 0.3% | 0.3% | 0.3% |
| Scavenger | 2% | 2% | 2% |
| MTM | 2% | 2% | 2% |
| Green Strength (Pa) | 1236.5 | 1698.5 | 2620.6 |

*Comparative Examples

Example 8

100 g samples were prepared based on ingredients listed in Table 8. A pre-mix of MTM and HMDZ scavenger was added to polymer in a mixer, and then mixed for 30 seconds with approximately 50 mm Hg vacuum at the end of 5 seconds. Treated silica filler was added, and the mixing continued for approximately 180 seconds (till the complete wetting of the filler). After that, DBTDA and a silylated amine cure accelerator were added and mixed for approximately 90 seconds with approximately 50 mm Hg vacuum at the end of 30 seconds. The samples were packaged, centrifuged, stored and tested as described in Example 5. The composition and testing results are summarized in Table 8.

TABLE 8

Effect on Green Strength of Polymer in RTV Silicone Sealant Having Multi-Alkoxysilyl Chain Terminations

| Ingredients (wt. %) | 8-A* | 8-B |
|---|---|---|
| Polymer 1* | 82.7% | 0 |
| Polymer 3 | 0 | 82.7% |
| Treated Silica | 12% | 12% |
| DBTDA | 0.3% | 0.3% |
| Silylated Amine Cure Accelerator | 1% | 1% |
| Scavenger | 2% | 2% |
| MTM | 2% | 2% |
| Green Strength (Pa) | 2,543.40 | 3,611.2 |

*Comparative Example

Example 9

100 g samples were prepared based on the ingredients listed in Table 9. Polymer, plasticizer, DBTDA and a pre-mix of MTM and scavenger were added into a mixer, and then mixed for 30 seconds with approximately 50 mm Hg vacuum at the end of 5 seconds. Both ground calcium carbonate and treated silica fillers were added, and the mixing continued for approximately 210 seconds (till the complete wetting of the fillers) with approximately 50 mm Hg vacuum at the end of 30 seconds. The samples were packaged, centrifuged, stored and tested as described in Example 5. The ingredients and testing results are summarized in Table 9.

TABLE 9

Effect on Green Strength of Polymer in RTV Silicone Sealant Having Multi-Alkoxysilyl Chain Terminations

| Ingredients (wt. %) | 9-A* | 9-B |
|---|---|---|
| Polymer 6* | 38.35% | 0 |
| Polymer 3 | 0 | 38.35% |
| Gmd. Calcium Carbonate | 45% | 45% |
| Treated Silica | 3% | 3% |
| Plasticizer | 10% | 10% |
| DBTDA | 0.15% | 0.15% |
| Scavenger | 2.5% | 2.5% |
| MTM | 1% | 1% |
| Green Strength (Pa) | 43.0 | 1228.8 |

*Comparative Example

We claim:

1. A RTV silicone composition curable in the presence of moisture, comprising (A) 0 to about 85 weight percent polydiorganosiloxanes comprising on average at least 1.2 chain terminations per molecule selected from the group consisting of hydroxysilyl groups described by formula $$—SiR^2_2OH, \qquad (I)$$

and alkoxysilyl groups described by formula $$—Z_y—SiR^2_x(OR^3)_{3-x}, \qquad (II)$$

where each $R^2$ is independently selected from the group consisting of a hydrogen atom and monovalent hydrocarbon radicals comprising 1 to about 18 carbon atoms, each $R^3$ is an independently selected alkyl radical comprising 1 to about 8 carbon atoms, each Z is independently selected from the group consisting of divalent hydrocarbon radicals comprising about 2 to 18 carbon atoms and a combination of divalent hydrocarbon radicals and siloxane segments described by formula

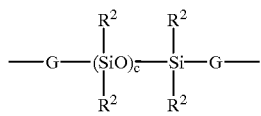

where $R^2$ is as defined above, each G is an independently selected divalent hydrocarbon radical comprising about 2 to 18 carbon atoms, and c is a whole number from 1 to about 6, x is 0 or 1, and y is 0 or 1;

(B) about 10 to 95 weight percent polydiorganosiloxanes comprising on average at least 1.2 chain terminations per molecule selected from the group consisting of hydroxysilyl groups, alkoxysilyl groups, and multi-alkoxysilyl groups described by formula $$—Z_b—R^4(Z—SiR^2_n(OR^3)_{3-n})_a \qquad (III)$$

provided that at least one chain termination per molecule comprises a multi-alkoxysilyl group, where $R^2$, $R^3$, and Z are as defined above, $R^4$ is independently selected from the group consisting of a silicon atom and a siloxane radical comprising at least two silicon atoms and each Z is bonded to a silicon atom of $R^4$ with the remaining valences of the silicon atoms of $R^4$ being bonded to a hydrogen atom, a monovalent hydrocarbon radical comprising 1 to about 18 carbon atoms, or forming siloxane bonds, n is 0, 1, or 2, a is at least 2, and b is 0 or 1, provided, when b is 0, $R^4$ is bonded to the polydiorganosiloxane through a siloxane bond;

(C) an effective amount of a condensation catalyst;

(D) 0 to about 40 weight percent of an alkoxysilane described by formula $$R_zSi(OR^1)_{4-z},$$

where each R is an independently selected monovalent hydrocarbon radical comprising 1 to about 18 carbon atoms, each $R^1$ is an independently selected alkyl radical comprising 1 to about 6 carbon atoms, and z is 0, 1, or 2; and (E) 0 to about 60 weight percent of a filler;

provided that the sum of the weight percents of Components (A) and (B) comprises about 20 to 95 weight percent based on the total weight of the RTV silicone composition.

2. The RTV silicone composition of claim 1, where $R^4$ of the multi-alkoxysilyl group of Component (B) is selected from the group consisting of a silicon atom and a siloxane radical comprising at least two silicon atoms described by formula $$(R^2_3SiO_{1/2})_d(R^2_2SiO_{2/2})_e(R^2SiO_{3/2})_f(SiO_{4/2})_g$$

where the sum of d+e+f+g is in a range from 2 to about 50, provided that at least 2 $R^2$ groups are replaced by Z groups of the multi-alkoxysilyl group as described by formula (III).

3. The RTV silicone composition of claim 1, where $R^4$ of the multi-alkoxysilyl group of Component (B) is selected from the group consisting of a silicon atom and a siloxane radical comprising at least two silicon atoms described by formula $$(R^2_3SiO_{1/2})_d(R^2_2SiO_{2/2})_e(R^2SiO_{3/2})_f(SiO_{4/2})_g$$

where d is an integer from 0 to 5, e is an integer from 0 to 30, f is an integer from 0 to 5, g is an integer from 0 to 5 and the sum of d+e+f+g is greater than 2, provided that at least 2 $R^2$ groups are replaced by Z groups of the multi-alkoxysilyl group as described by Formula (III).

4. The RTV silicone composition of claim 1 where the multi-alkoxysilyl group is selected from the group consisting of

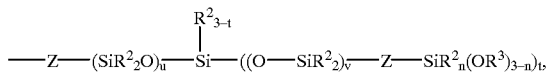

and

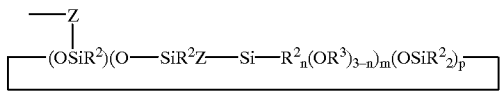

where m is an integer from 2 to 7; p is an integer from 0 to 6; m+p is an integer from 2 to 8; t is 2 or 3; u is an integer from 0 to 5; and v is an integer from 0 to 5.

5. A RTV silicone composition, curable in the presence of moisture, comprising (A) 0 to about 85 weight percent polydiorganosiloxanes comprising on average at least 1.2 chain terminations per molecule selected from the group consisting of hydroxysilyl groups described by formula $$—SiR^2_2OH, \qquad (I)$$

and alkoxysilyl groups described by formula $$—Z_y—SiR^2_x(OR^3)_{3-x}, \qquad (II)$$

where each $R^2$ is independently selected from the group consisting of a hydrogen atom and monovalent hydrocarbon radicals comprising 1 to about 18 carbon atoms, each $R^3$ is an independently selected alkyl radical comprising 1 to about 8 carbon atoms, each Z is independently selected from the group consisting of divalent hydrocarbon radicals comprising about 2 to 18 carbon atoms and a combination of divalent hydrocarbon radicals and siloxane segments described by formula

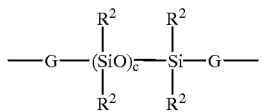

where $R^2$ is as defined above, each G is an independently selected divalent hydrocarbon radical comprising about 2 to 18 carbon atoms, and c is a whole number from 1 to about 6, x is 0 or 1, and y is 0 or 1;

(B) about 10 to 95 weight percent polydiorganosiloxanes comprising on average at least 1.2 chain terminations per molecule selected from the group consisting of hydroxysilyl groups, alkoxysilyl groups, and multi-alkoxysilyl groups described by formula $$-Z_b-R^4(Z-SiR^2{}_n(OR^3)_{3-n})_a \qquad (III)$$

provided that at least one chain termination per molecule comprises a multi-alkoxysilyl group, where $R^2$, $R^3$, and Z are as defined above, $R^4$ is independently selected from the group consisting of a silicon atom and a siloxane radical comprising at least two silicon atoms and each Z is bonded to a silicon atom of $R^4$ with the remaining valences of the silicon atoms of $R^4$ being bonded to a hydrogen atom, a monovalent hydrocarbon radical comprising 1 to about 18 carbon atoms, or forming siloxane bonds, n is 0, 1, or 2, a is at least 2, and b is 0 or 1, provided, when b is 0, $R^4$ is bonded to the polydiorganosiloxane through a siloxane bond;

(C) about 0.05 to 5 weight percent of a titanium compound;

(D) 0 to about 40 weight percent of an alkoxysilane described by formula $$R_zSi(OR^1)_{4-z},$$

where each R is an independently selected monovalent hydrocarbon radical comprising 1 to about 18 carbon atoms, each $R^1$ is an independently selected alkyl radical comprising 1 to about 6 carbon atoms, and z is 0, 1, or 2; and (E) 0 to about 60 weight percent of a filler;
provided that the sum of the weight percents of Components (A) and (B) comprises about 20 to 95 weight percent based on the total weight of the RTV silicone composition.

6. The RTV silicone composition of claim 5, where Component (A) comprises repeating siloxy units described by formula $R^2{}_sSiO_{(4-s)/2}$, where s is 0, 1, or 2.

7. The RTV silicone composition of claim 5, where Component (A) comprises repeating siloxy units described by formula $-(R^2{}_2SiO)_h-$, where each $R^2$ is independently selected from the group consisting of a hydrogen atom and monovalent hydrocarbon radicals comprising 1 to about 8 carbon atoms, and h is a value such that the polyorganosiloxanes have a viscosity within a range of about 0.5 to 3000 Pa·s at 25° C.

8. The RTV silicone composition of claim 7, where Component (A) comprises on average at least 1.5 chain terminations per molecule comprising alkoxysilyl groups, x is 0 or 1, and y is 1.

9. The RTV silicone composition of claim 5, where Component (B) comprises repeating siloxy units described by formula $R^2{}_sSiO_{(4-s)/2}$, where s is 0, 1, or 2.

10. The RTV silicone composition of claim 5, where Component (B) comprises repeating siloxy units described by formula $-(R^2{}_2SiO)_h-$, where each $R^2$ is independently selected from the group consisting of a hydrogen atom and monovalent hydrocarbon radicals comprising 1 to about 8 carbon atoms, and h is a value such that the polyorganosiloxanes have a viscosity within a range of about 0.5 to 3000 Pa·s at 25° C.

11. The RTV silicone composition of claim 9, where Component (B) comprises on average at least 1.5 chain terminations per molecule selected from the group consisting of hydroxysilyl groups, alkoxysilyl groups, and multi-alkoxysilyl groups, provided that at least one chain termination per molecule comprises a multi-alkoxysilyl group.

12. The RTV silicone composition of claim 10, where each polydiorganosiloxane chain termination of Component (B) comprises a multi-alkoxysilyl group.

13. The RTV silicone composition of claim 5, where $R^4$ of the multi-alkoxysilyl group of Component (B) is selected from the group consisting of a silicon atom and a siloxane radical comprising at least two silicon atoms described by formula $$(R^2{}_3SiO_{1/2})_d(R^2{}_2SiO_{2/2})_e(R^2SiO_{3/2})_f(SiO_{4/2})_g$$

where the sum of d+e+f+g is in a range from 2 to about 50, provided that at least 2 $R^2$ groups are replaced by Z groups of the multi-alkoxysilyl group as described by formula (III).

14. The RTV silicone composition of claim 5, where $R^4$ of the multi-alkoxysilyl group of Component (B) is selected from the group consisting of a silicon atom and a siloxane radical comprising at least two silicon atoms described by formula $$(R^2{}_3SiO_{1/2})_d(R^2{}_2SiO_{2/2})_e(R^2SiO_{3-2})_f(SiO_{4/2})_g$$

where d is an integer from 0 to 5, e is an integer from 0 to 30, f is an integer from 0 to 5, g is an integer from 0 to 5 and the sum of d+e+f+g is greater than 2, provided that at least 2 $R^2$ groups are replaced by Z groups of the multi-alkoxysilyl group as described by Formula (III).

15. The RTV silicone composition of claim 5 where the multi-alkoxysilyl group is selected from the group consisting of

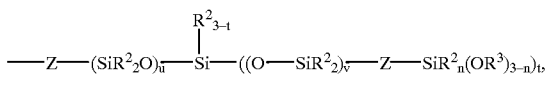

and

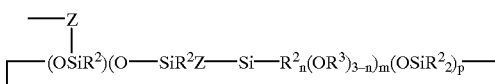

where m is an integer from 2 to 7; p is an integer from 0 to 6; m+p is an integer from 2 to 8; t is 2 or 3; u is an integer from 0 to 5; and v is an integer from 0 to 5.

16. The RTV silicone composition of claim 5 where the multi-alkoxysilyl group is selected from the group consisting of

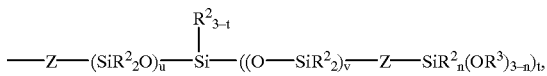

and

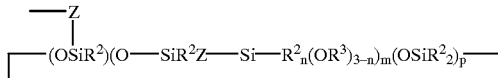

where m is an integer from 2 to 4; p is an integer from 0 to 3; m+p is an integer from 2 to 5; t is 2 or 3; u is an integer from 0 to 1; and v is an integer from 0 to 1.

17. The RTV silicone composition of claim 12 where the multi-alkoxysilyl group is selected from the group consisting of

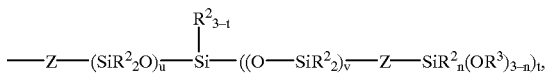

and

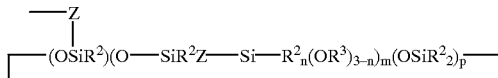

where m is an integer from 2 to 4; p is an integer from 0 to 3; m+p is an integer from 2 to 5; t is 2 or 3; u is an integer from 0 to 1; and v is an integer from 0 to 1.

18. The RTV silicone composition of claim 17 comprising 0.05 to 2 weight percent based on the total weight of the RTV silicone composition of a titanium compound selected from the group consisting of a tetraalkyltitanate and a chelated titanate.

19. The RTV silicone composition of claim 18 comprising about 0.5 to 10 weight percent based on the total weight of the RTV silicone composition of the alkoxysilane $R_zSi(OR^1)_{4-z}$, where each R is an independently selected monovalent hydrocarbon radical comprising 1 to 8 carbon atoms, $R^1$ is an alkyl radical comprising 1 to 4 carbon atoms, and z is 1; about 5 to 50 weight percent based on the total weight of the RTV silicone composition of a filler selected from the group consisting of a silica filler and a calcium carbonate filler; and the molar ratio of Component (B) to Component (A) is greater than 10 to 1.

20. A RTV silicone composition curable in the presence of moisture, comprising (A) 0 to about 85 weight percent polydiorganosiloxanes comprising on average at least 1.2 chain terminations per molecule selected from the group consisting of hydroxysilyl groups described by formula $$—SiR^2_2OH, \quad (I)$$

and alkoxysilyl groups described by formula $$—Z_y—SiR^2_x(OR^3)_{3-x}, \quad (II)$$

where each $R^2$ is independently selected from the group consisting of a hydrogen atom and monovalent hydrocarbon radicals comprising 1 to about 18 carbon atoms, each $R^3$ is an independently selected alkyl radical comprising 1 to about 8 carbon atoms, each Z is independently selected from the group consisting of divalent hydrocarbon radicals comprising about 2 to 18 carbon atoms and a combination of divalent hydrocarbon radicals and siloxane segments described by formula

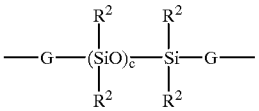

where $R^2$ is as defined above, each G is an independently selected divalent hydrocarbon radical comprising about 2 to 18 carbon atoms, and c is a whole number from 1 to about 6, x is 0 or 1, and y is 0 or 1;

(B) about 10 to 95 weight percent polydiorganosiloxanes comprising on average at least 1.2 chain terminations per molecule selected from the group consisting of hydroxysilyl groups, alkoxysilyl groups, and multi-alkoxysilyl groups described by formula $$—Z_b—R^4(Z—SiR^2_n(OR^3)_{3-n})_a \quad (III)$$

provided that at least one chain termination per molecule comprises a multi-alkoxysilyl group, where $R^2$, $R^3$, and Z are as defined above, $R^4$ is independently selected from the group consisting of a silicon atom and a siloxane radical comprising at least two silicon atoms and each Z is bonded to a silicon atom of $R^4$ with the remaining valences of the silicon atoms of $R^4$ being bonded to a hydrogen atom, a monovalent hydrocarbon radical comprising 1 to about 18 carbon atoms, or forming siloxane bonds, n is 0, 1, or 2, a is at least 2, and b is 0 or 1, provided, when b is 0, $R^4$ is bonded to the polydiorganosiloxane through a siloxane bond;

(C) about 0.001 to 1 weight percent of a tin compound;

(D) 0 to about 40 weight percent of an alkoxysilane described by formula $$R_zSi(OR^1)_{4-z},$$

where each R is an independently selected monovalent hydrocarbon radical comprising 1 to about 18 carbon atoms, each $R^1$ is an independently selected alkyl radical comprising 1 to about 6 carbon atoms, and z is 0, 1, or 2;

(E) 0 to about 60 weight percent of a filler;

(F) 0 to about 5 weight percent of a cure accelerator; and (G) 0 to about 10 weight percent of a scavenger;

provided that the sum of the weight percents of Components (A) and (B) comprises about 20 to 95 weight percent based on the total weight of the RTV silicone composition.

21. The RTV silicone composition of claim 20, where Component (A) comprises repeating siloxy units described by formula $R^2_sSiO_{(4-s)/2}$, where s is 0, 1, or 2.

22. The RTV silicone composition of claim 20, where Component (A) comprises repeating siloxy units described by formula $—(R^2_2SiO)_h—$, where each $R^2$ is independently selected from the group consisting of a hydrogen atom and monovalent hydrocarbon radicals comprising 1 to about 8 carbon atoms, and h is a value such that the polyorganosiloxanes have a viscosity within a range of about 0.5 to 3000 Pa·s at 25° C.

23. The RTV silicone composition of claim 22, where Component (A) comprises on average at least 1.5 chain terminations per molecule comprising alkoxysilyl groups, x is 0 or 1, and y is 1.

24. The RTV silicone composition of claim 20, where Component (B) comprises repeating siloxy units described by formula $R^2_sSiO_{(4-s)/2}$, where s is 0, 1, or 2.

25. The RTV silicone composition of claim 20, where Component (B) comprises repeating siloxy units described by formula —$(R^2{}_2SiO)_h$—, where each $R^2$ is independently selected from the group consisting of a hydrogen atom and monovalent hydrocarbon radicals comprising 1 to about 8 carbon atoms, and h is a value such that the polyorganosiloxanes have a viscosity within a range of about 0.5 to 3000 Pa·s at 25° C.

26. The RTV silicone composition of claim 24, where Component (B) comprises on average at least 1.5 chain terminations per molecule selected from the group consisting of hydroxysilyl groups, alkoxysilyl groups, and multi-alkoxysilyl groups, provided that at least one chain termination per molecule comprises a multi-alkoxysilyl group.

27. The RTV silicone composition of claim 25, where each polydiorganosiloxane chain termination of Component (B) comprises a multi-alkoxysilyl group.

28. The RTV silicone composition of claim 20, where $R^4$ of the multi-alkoxysilyl group of Component (B) is selected from the group consisting of a silicon atom and a siloxane radical comprising at least two silicon atoms described by formula $$(R^2{}_3SiO_{1/2})_d(R^2{}_2SiO_{2/2})_e(R^2SiO_{3/2})_f(SiO_{4/2})_g$$

where the sum of d+e+f+g is in a range from 2 to about 50, provided that at least 2 $R^2$ groups are replaced by Z groups of the multi-alkoxysilyl group as described by formula (III).

29. The RTV silicone composition of claim 20, where $R^4$ of the multi-alkoxysilyl group of Component (B) is selected from the group consisting of a silicon atom and a siloxane radical comprising at least two silicon atoms described by formula $$(R^2{}_3SiO_{1/2})_d(R^2{}_2SiO_{2/2})_e(R^2SiO_{3/2})_f(SiO_{4/2})_g$$

where d is an integer from 0 to 5, e is an integer from 0 to 30, f is an integer from 0 to 5, g is an integer from 0 to 5 and the sum of d+e+f+g is greater than 2, provided that at least 2 $R^2$ groups are replaced by Z groups of the multi-alkoxysilyl group as described by Formula (III).

30. The RTV silicone composition of claim 20 where the multi-alkoxysilyl group is selected from the group consisting of

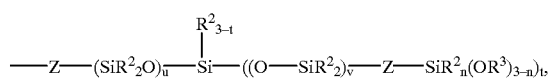

and

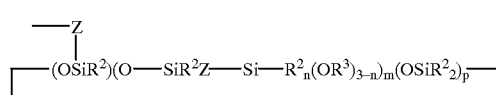

where m is an integer from 2 to 7; p is an integer from 0 to 6; m+p is an integer from 2 to 8; t is 2 or 3; u is an integer from 0 to 5; and v is an integer from 0 to 5.

31. The RTV silicone composition of claim 20 where the multi-alkoxysilyl group is selected from the group consisting of

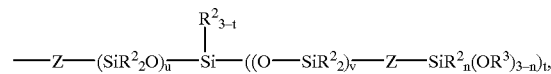

and

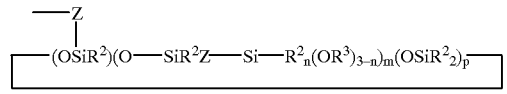

where m is an integer from 2 to 4; p is an integer from 0 to 3; m+p is an integer from 2 to 5; t is 2 or 3; u is an integer from 0 to 1; and v is an integer from 0 to 1.

32. The RTV silicone composition of claim 28 where the multi-alkoxysilyl group is selected from the group consisting of

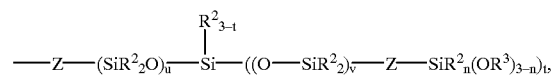

and

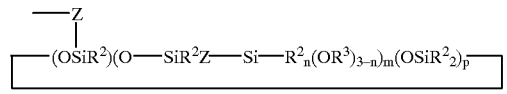

where m is an integer from 2 to 4; p is an integer from 0 to 3; m+p is an integer from 2 to 5; t is 2 or 3; u is an integer from 0 to 1; and v is an integer from 0 to 1.

33. The RTV silicone composition of claim 32 comprising (C) about 0.01 to 0.8 weight percent based on the total weight of the RTV silicone composition of a tin compound selected from the group consisting of dibutyltindiacetate and dibutyltinbis(2,4-pentanedionate).

34. The RTV silicone composition of claim 20 comprising (F) 0 to about 5 weight percent based on the total weight of the RTV silicone composition of a cure accelerator selected from the group consisting of substituted guanidines, amidines, and amines; and (G) 0 to about 10 weight percent based on the total weight of the RTV silicone composition of a scavenger selected from the group consisting of a silazane compound having the formula (VIII)

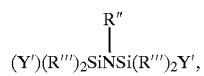

and a cyclosilazane compound having the formula (IX)

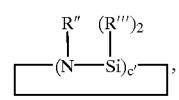

where each Y' is independently selected from the group consisting of R''' and R''$_2$N—, R'' is selected from the group consisting of hydrogen, monovalent hydrocarbon radicals, and fluoroalkyl radicals, each R''' is independently selected from the group consisting of hydrogen atoms, monovalent hydrocarbon radicals and fluoroalkyl radicals, and c' is an integer from 3 to 6.

35. The RTV silicone composition of claim 33 comprising (F) about 0.01 to 2 weight percent based on the total weight of the RTV silicone composition of a cure accelerator selected from the group consisting of substituted guanidines, amidines, and amines; and (G) about 0.5 to 10 weight percent based on the total weight of the RTV silicone composition of a scavenger selected from the group consisting of a silazane compound having the formula

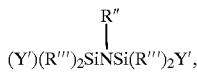

(VIII)

$(Y')(R''')_2SiNSi(R''')_2Y'$, and a cyclosilazane compound having the formula

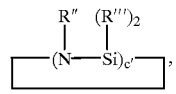

(IX)

where each Y' is independently selected from the group consisting of R''' and R''$_2$N—, R'' is selected from the group consisting of hydrogen, monovalent hydrocarbon radicals, and fluoroalkyl radicals, each R''' is independently selected from the group consisting of hydrogen atoms, monovalent hydrocarbon radicals and fluoroalkyl radicals, and c' is an integer from 3 to 6.

36. The RTV silicone composition of claim 33 comprising (F) about 0.05 to 1 weight percent based on the total weight of the RTV silicone composition of a cure accelerator selected from the group consisting of 1,8-diazabicyclo[5.4.0]undec-7-ene and N-(2-aminoethyl)-3-aminopropyltrimethoxysilane; and (G) about 0.5 to 10 weight percent based on the total weight of the RTV silicone composition of a hexamethyldisilazane scavenger.

37. The RTV silicone composition of claim 36 comprising (D) about 0.5 to 10 weight percent based on the total weight of the RTV silicone composition of the alkoxysilane $R_zSi(OR^1)_{4-z}$, where each R is an independently selected monovalent hydrocarbon radical comprising 1 to 8 carbon atoms, $R^1$ is an alkyl radical comprising 1 to 4 carbon atoms, and z is 1; (E) about 5 to 50 weight percent based on the total weight of the RTV silicone composition of a filler selected from the group consisting of a silica filler and a calcium carbonate filler; and the molar ratio of Component (B) to Component (A) is greater than 10 to 1.

\* \* \* \* \*